US012719788B2

(12) United States Patent
Ding et al.

(10) Patent No.: US 12,719,788 B2
(45) Date of Patent: Aug. 25, 2026

(54) ENHANCED SERVICE CLASSIFICATION FOR SERVICE FUNCTION CHAINING IN NEXT GENERATION CELLULAR NETWORKS

(71) Applicant: INTEL CORPORATION, Santa Clara, CA (US)

(72) Inventors: Zongrui Ding, Portland, OR (US); Qian Li, Portland, OR (US); Alexandre Saso Stojanovski, Paris (FR); Sudeep Palat, Cheltenham (GB); Thomas Luetzenkirchen, Taufkirchen (DE); Abhijeet Kolekar, Portland, OR (US); Ching-Yu Liao, Portland, OR (US); Sangeetha Bangolae, Portland, OR (US); Youn Hyoung Heo, Seoul (KR); Xiaopeng Tong, Beijing (CN)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 18/553,425

(22) PCT Filed: May 26, 2022

(86) PCT No.: PCT/US2022/031161
§ 371 (c)(1),
(2) Date: Sep. 29, 2023

(87) PCT Pub. No.: WO2022/251518
PCT Pub. Date: Dec. 1, 2022

(65) Prior Publication Data

US 2024/0187340 A1 Jun. 6, 2024

Related U.S. Application Data

(60) Provisional application No. 63/194,698, filed on May 28, 2021.

(51) Int. Cl.
*H04L 45/655* (2022.01)
*H04L 69/22* (2022.01)
*H04W 40/02* (2009.01)

(52) U.S. Cl.
CPC ........... *H04L 45/655* (2022.05); *H04L 69/22* (2013.01); *H04W 40/02* (2013.01)

(58) Field of Classification Search
CPC ..... H04L 45/655; H04L 69/22; H04L 45/742; H04L 45/07; H04W 40/02
See application file for complete search history.

(56) References Cited

U.S. PATENT DOCUMENTS

2017/0339505 A1 11/2017 Purnhagen et al.
2018/0091410 A1* 3/2018 Browne ............. H04L 41/5009
(Continued)

FOREIGN PATENT DOCUMENTS

JP 2019121829 A 7/2019

OTHER PUBLICATIONS

International Preliminary Report on Patentability mailed Dec. 7, 2023 in Application No. PCT/US2022/031161, 6 pages.
(Continued)

*Primary Examiner* — Schquita D Goodwin
(74) *Attorney, Agent, or Firm* — Gray Ice Higdon, PLLC

(57) ABSTRACT

This disclosure describes systems, methods, and devices related to service function chaining classification in wireless networks. A communications network system may include a first cellular network device configured to: receive service data adaptation protocol (SDAP) data from a user equipment (UE) device, the SDAP data comprising a SDAP header; identify a service chaining function (SFC) service identifier of the SDAP header; determine that the SFC service identifier is indicative of a SFC service profile, the SFC service profile indicative of quality of service (QOS) traffic charac-
(Continued)

teristics; identify a SFC traffic flow associated with the SFC service identifier; and transmit the SDAP data to a second cellular network device; and wherein the second cellular network device is configured to: receive the SDAP data from the first cellular network device; and transmit the SDAP data to a service function of the system.

19 Claims, 10 Drawing Sheets

(56) References Cited

U.S. PATENT DOCUMENTS

| | | | | |
|---|---|---|---|---|
| 2018/0145899 | A1 | 5/2018 | Rao | |
| 2019/0182153 | A1 | 6/2019 | Gundavelli et al. | |
| 2019/0238345 | A1* | 8/2019 | Gage | H04L 9/088 |
| 2020/0404538 | A1* | 12/2020 | Zhu | H04W 28/0268 |
| 2021/0045188 | A1 | 2/2021 | Han et al. | |
| 2021/0119909 | A1* | 4/2021 | Eastlake, III | H04L 69/22 |
| 2021/0160727 | A1 | 5/2021 | Jiang | |
| 2022/0103658 | A1* | 3/2022 | Pack | H04L 47/2483 |

OTHER PUBLICATIONS

International Search Report and Written Opinion of the International Searching Authority issued Sep. 19, 2022 for corresponding PCT International Application No. PCT/US2022/02031161 (7 pp).
Notice of Reasons for Refusal mailed Oct. 1, 2024 in Japanese Application No. 2023-551971, 6 pages.

* cited by examiner

ENHANCED SERVICE CLASSIFICATION FOR SERVICE FUNCTION CHAINING IN NEXT GENERATION CELLULAR NETWORKS

CROSS-REFERENCE TO RELATED APPLICATION(S)

This application is a U.S. National Stage Application under 35 U.S.C. 371 and claims the priority benefit of International Application No. PCT/US2022/031161,filed May 26, 2023, and U.S. Provisional Application No. 63/194,698, filed May 28, 2021, the disclosures of which is are incorporated by reference as set forth in full.

TECHNICAL FIELD

This disclosure generally relates to systems and methods for wireless communications and, more particularly, to service function chaining classification in 6th Generation (6G) communications.

BACKGROUND

Wireless devices are becoming widely prevalent and are increasingly using wireless channels. The 3rd Generation Partnership Program (3GPP) is developing one or more standards for wireless communications.

DETAILED DESCRIPTION

Figures 1A, 1B:
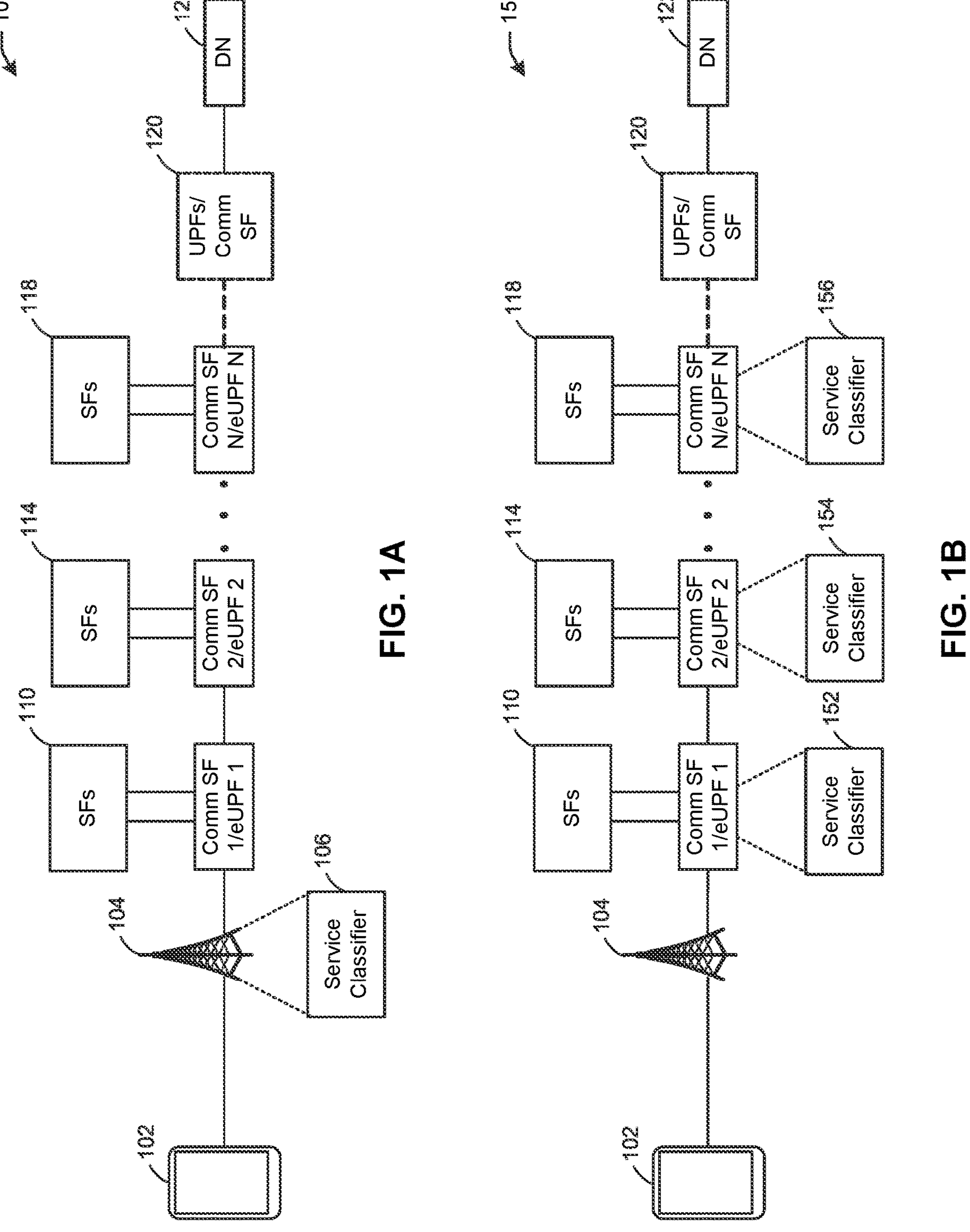
FIG. 1A shows an example service function chaining (SFC) traffic path for SFC service classification, in accordance with one or more example embodiments of the present disclosure.
FIG. 1B shows an example SFC traffic path for SFC service classification, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless devices may communicate as defined by technical standards. For cellular telecommunications, standardization groups such as the 3rd Generation Partnership Program (3GPP) and the Open Radio Access Network (O-RAN) Alliance define communication techniques, including for service function chaining in 6th Generation (6G) cellular devices and cellular networks.

One 6G trend is the integration of information technology (IT) and communication technology (CT) with the deeper penetration of a cloud-native paradigm, such as virtualization, programmability, automation, micro-service, etc. to telecommunications networks. The 6G network is expected to provide end-to-end services with most applications transforming into a micro-service based with an enhanced architecture with computing, data, and communication planes. This enables flexibly on-board and off-board service functions such as application instances, computing tasks, data pre-processing and storage. To realize different service logic along the traffic path, the capability of service function chaining (SFC) is required. SFC refers to steering traffic using sequences of virtualized/containerized network functions (VNFs/CNFs—virtual machines or containers that host virtualized/containerized network services).

SFC enables the creation of composite (e.g., network) services that consist of an ordered set of service functions (SFs) to be applied to packets and/or frames and/or flows selected as a result of classification. The purpose of classification is to differentiate between different packets/flows based on rules from different layers such as Internet Protocol (IP) 5-tuple, packet/flow identifiers, applications, quality of service (QOS), or for the purpose of load balancing, etc. After traffic classification, an encapsulation or transport mapping rule can be applied to steer the SFC flow to a SFC path with traffic forwarders and the required SFs, for example.

In next generation cellular networks, the SFC service can consist of the computing (Comp)/data service functions (SFs) such as a data labeling and pre-processing functions, or an application instance, as a computing workload. The current 5G network handles non-SFC flows based on a QoS framework to set up within protocol data unit (PDU) sessions (i.e., end to end tunnel) between a user equipment device (UE) and a PDU session anchor UPF with DRB mapping at the gNB. The gNB performs a DRB to TEID mapping based on the SDAP entity configuration and PDU session information set up by a RRCReconfiguration Message and PDU session establishment/modification procedure.

In addition, the current 5G network allows multiple QoS flows per PDU session, and a header (e.g., a service data adaptation protocol header of a service data adaptation protocol data unit) indicates to which flow a packet belongs. There is a 1:1 mapping between SDAP and a PDU session, which may include multiple QoS flows. A gNB may receive an SDAP entity (e.g., an SDAP PDU), and may use the information in the SDAP entity header to determine to which QoS flow and PDU session the entity belongs. However, the 5G network currently does not classify flows in a manner that distinguishes between SFC and non-SFC flows.

To enable SFC in the next generation cellular network, the traffic or service classification is required to differentiate between the SFC flows and the non-SFC flows to apply a corresponding mapping rule for the transport and/or encapsulation, which can be based on different protocols such as Segment Routing (SR) besides GTP tunneling.

In one or more embodiments, to enable traffic/service classification, the following solutions are provided in this disclosure: (1) How to model the SFC traffic; (2) defining the essential information identified to describe SFC traffic; (3) defining the information and mechanism required to differentiate SFC flows from non-SFC flows; (4) defining the information and mechanism required to map the SFC flows to the transport and/or encapsulation; and (5) defining how to configure the information mentioned above through a control and a user plane in the cellular network. In contrast, some existing SFC framework focuses on the service layer encapsulation, but not traffic classification. Regarding the traffic classification in the cellular networks, there are more factors to consider such as description of a SFC flow, flow differentiation with the non-SFC flows, QoS, transport mapping, etc., which are not discussed in the existing techniques.

In one or more embodiments, a SFC service classifier is proposed for the purpose of traffic classification based on the following scenarios: scenario 1): traffic classifier at the xNB, or scenario 2): traffic classifier at the communication (Comm) SF/eUPF, so that to differentiate SFC and non-SFC flows, map the flow to the next hop Comm SF/eUPF (e.g., traffic forwarder) with the configured transport/encapsulation following the SFC traffic path. The SFC service ID and corresponding SDAP enhancements are proposed to describe the SFC service profile and facilitate xNB to map the SFC flows based on different granularities in one scenario. An eUPF enhancement to set up traffic classifier as a modification to 5G ULCL is proposed for another scenario. In this manner, the 6G architecture enables SFC for the computing/data service functions. This scenario requires computing and storage infrastructure for the cellular network.

In one or more embodiments, the 6G architecture to enable SFC is defined with detailed function description and procedures to set up a SFC path. The service classifier may be in the RAN. However, the service classifier can also be in the Comm SF or UPF based on different mechanisms. In the present disclosure, the SFs are generally Comp/Data functions including those commonly used in the cloud and cellular environment such as a Firewall, NAT, DPI, LI functions. The 6G architecture adds an AMF, SOEF, data plane CFs and SFs, comp plane CFs and SFs, Comm CFs and SFs, an SOCF, enhanced UPFs, an enhanced SMF, and the traffic classifier to the existing 5G architecture.

In one or more embodiments, the SFC traffic can be modeled as flow with QoS differentiation or default QOS similar to a 5G QoS flow. As part of the SFC service context, the service ID can be used to identify a SFC flow or SFC traffic path. A SFC traffic path is defined as the combination of transport and ordered list of SFs in the path. Note that the QoS differentiated at transport level and SF level are not included in the traffic path, which means the SFC flows using the same SFC traffic path may have different QoS at transport level and SF level.

In one or more embodiments, essential functions in a SFC path include a traffic classifier and traffic forwarder towards the SFs. The SFC traffic paths can be categorized into two scenarios based on the service classifier at xNB and at one or more of the Comm SFs/eUPFs. If a Comm SF connects to an eUPF, interworking mechanisms are required. The traffic path may include an Comm SF or anchor UPF to connect to a DN, or the traffic path can terminate at a SF. In the present disclosure, one enhancement is the service classifier. The traffic forwarder can be part of the Comm SF/eUPF functionality.

In one or more embodiments, the service classifier may be at the xNB for both Comm SF or eUPF based transport. There can be one or more Comm SFs/eUPFs to form a SFC path. For each of the Comm SF or eUPF, there may be one or more SFs depending on the mechanisms to enable SFC or implementation specific. Comm SF/eUPFs on the SFC path may function like a SFF, and therefore may deliver packets to local Comp/data functions.

In one or more embodiments, the SFC service profile is defined similar to a QoS profile in the current 5G networks, which is identified by the SFC service ID similar to a QFI/5QI. Specifically, the SFC service profile can be the same as or part of the SFC service context.

In one or more embodiments, there are options to enable SDAP UL header to include the SFC service ID, which can be used at the xNB for service classification, transport mapping and encapsulation.

In one or more embodiments, Option 1 for the updated fields of UL SDAP header may include: (1) SFCI: 1-bit indicator set as 1 to replace R field which is reserved and always set to 0. When the SFCI is set to 1, the following field is a SFC service ID instead of a QFI. (2) SFC service ID: the SFC identifier for a SFC profile can be used with or without a PDU session. The length of the SFC service ID can be different from a QFI/5QI.

In one or more embodiments, Option 2 for the updated fields of UL SDAP header may include: (1) SFCI: 1-bit indicator set as 1 to replace R field which is reserved and always set to 0 similar to SDAP Option 1. (2) SFC service ID: the SFC identifier for a SFC profile similar to SDAP Option 1. (3) M/I: 1-bit SFC metadata indicator. If M/I is set to 1, there is metadata included in the SDAP header. (4) R: 1-bit reserved and generally set as 0. (5) FI/6G QOS indicator: the QoS identifier for the SFC traffic characteristics similar to current QFI/5QI. The QFI/6G QoS indicator can be part of the SFC service profile. (6) Metadata length: the bit or byte number of the SFC metadata. (7) Metadata: the metadata is the SFC information including but not limited to: the information for service classification at the xNB, the metadata to the SFs for the SFC traffic path, the update for SFC parameters/policy, application related information, and/or UE related information. This metadata can be a container which is sent periodically between UE and xNB or triggered by events such as from an application.

In one or more embodiments, the DL SDAP header modification is similar to the UL and sent from xNB to UE.

In one or more embodiments, the classification may be a SFC service ID based service classification at xNB. This clause provides the solutions of the mapping rule for a SFC flow to a SFC traffic path. Solution 1.1: the SFC flow shares the same PDU sessions with non-SFC flows. In this solution, a SFC flow shares the same PDU session anchor (PSA) and session ID with the other non-SFC flows. SFC service ID: pointing to a SFC service profile which can be used for different PDU sessions similar to a QFI/5QI. The SFC service ID can be regarded as an extension of the QFI/5QI. The service ID and partial/full SFC service context can be sent to UE via the procedures to set up a SFC flow. SDAP configuration: SDAP entity is configured per PDU session which includes both the SFC flows and the non-SFC flows. SDAP Option 1. One scenario applies where the transport QoS information such as traffic characteristics, priority, delay budget, GBR/non-GBR, etc. can be included in the SFC service profile. The SDAP entity is still configured following the RRCReconfiguration message with the following modified ASN.1 description of SDAP-Config to add SFC flows as shown below:

```
SDAP-Config : :    Sequence {
pdu-Session        PDU-SessionID
sdap-HeaderDL      ENUMERATED {present, absent},
sdap-HeaderUL      ENUMERATED {present, absent},
defaultDRB         BOOLEAN,
mappedQoS-FlowsToAdd     SEQUENCE (SIZE(1..MAXnROFQFIs)) OF QFI
mappedQoS-FlowsToRelease SEQUENCE (SIZE (1..MAXnROFQFIs)) OF QFI
mappedSFC-FlowsToAdd SEQUENCE (SIZE (1..MAXnROFServiceIDs)) OF Service ID
mappedSFC-FlowsToRelease SEQUENCE (SIZE (1..MAXnROFServiceIDs)) OF Service ID
```

The mappedSFC-FlowsToAdd SEQUENCE (SIZE (1 . . . MAXnROFServiceIDs)) OF Service ID and the mappedSFC-FlowsToRelease SEQUENCE (SIZE (1 . . . MAXnROFServiceIDs)) OF Service ID may be added to the existing configuration.

In one or more embodiments, a service classifier mapping rule may define: for UL SFC traffic, the SDAP entity associated with a PDU session can be mapped to a DRB and following the reversed process to map back to a PDU session, then the SFC flow can be mapped to a N3' transport, e.g., GTP tunnel identified by TEID, a L3VPN tunnel, Segment Routing (SR) labels, etc. towards next-hop eUPF/Comm SF based on different traffic forwarder schemes. For DL traffic, the PSA can apply packet filter to classify the packet towards next-hop eUPF/Comm SF as the N3' transport. The xNB follows the reverse process to map the TEID, other tunnel ID, SR labels to the PDU session ID, thus the SDAP entity. The transport information at the eUPF/Comm SF is configured during the SFC flow setup procedure.

In one or more embodiments, for QoS: The service ID can be carried with the transport protocol or as part of a new encapsulation/labels, which points to the traffic QoS characteristics as part of the SFC service profile and configured through the user plane. Therefore, QoS can be realized similar to the current 5G QoS framework.

In one or more embodiments, solution 1.2 to having the SFC classification at xNB may be to use separate PDU sessions for SFC flows and non-SFC flows (e.g., in contrast with solution 1.1, in which a SFC flow may share PDU sessions with non-SFC flows). In solution 1.2, separate PDU sessions can be set up for SFC flows. Therefore, a PDU session can be categorized either as a PDU session for non-SFC flows or SFC flows. Adding a new SFC flow can be based on the SFC PDU session establishment/modification procedure. There are three options to realize different SFC flow granularity based on how to map the SFC service ID at the xNB.

In one or more embodiments, Option 1 for solution 1.2 may be as follows. SFC service ID can identify the SFC traffic path with default traffic path QoS. In this option, the SFC service ID is similar to a PDU session ID for SFC and additional SF level QoS can be handled at application layer, e.g., through meta-data or app-level information. The PDU session ID for SFC can be reused as a SFC service ID as long as the SFC traffic path are the same. For this option, the SDAP header is not modified, but the SDAP entity configuration is updated to include PDU-sessionType as SFC or non-SFC as shown below:

```
SDAP-Config : :      Sequence {
pdu-Session          PDU-SessionID
pdu-SessionType      ENUMERATED {SFC, non-SFC}
sdap-HeaderDL        ENUMERATED {present, absent},
sdap-HeaderUL        ENUMERATED {present, absent},
defaultDRB           BOOLEAN,
```

-continued

```
mappedQoS-FlowsToAdd    SEQUENCE (SIZE (1..MAXnROFQFIs))
OF QFI
mappedQoS-FlowsToRelease SEQUENCE (SIZE (1..MAXnROFQFIs))
OF QFI
```

The pdu-Session PDU-SessionID may be an update to the SDAP entity configuration.

In one or more embodiments, Option 2 for solution 1.2 may be as follows. SFC service ID can identify a path with QoS profile and the mapping rule and enhancement to SDAP header are similar to Solution 1.1.

In one or more embodiments, Option 3 for solution 1.2 may be as follows. SFC service ID can identify a path with SFC service ID, additional QFI or 6G QOS identifier used for different QoS profile. The SDAP header modification Option 2 may apply. For this option, SFC flows with different QFI/6G QOS ID can share the same service ID and SDAP entity. The mapping rule is similar to Solution 1.1.

In one or more embodiments, Solution 2 may include no PDU session for SFC flows. The difference between Solution 1.2 and Solution 2 is that SFC flows without a PDU session don't need a PSA. Therefore, mobility may be handled in a different way, which is out of the scope of this disclosure. Solution 1.2 still applies, and the SFC service ID can be used to identify a SDAP entity.

In one or more embodiments, the service classification may be a packet filter based service classification at xNB. The service classification at the xNB can also be based on packet filter similar to a ULCL or UPF. In this case, additional functionality of packet filter needs to be added to xNB to filter the PDU, and there may be no impact on other layers such as SDAP on the UE and xNB side.

In one or more embodiments, Scenario 2 may include a service classifier at the Comm SF/eUPF. The service classifier can be at one or more Comm SF/eUPF. Specifically, the SFC path only involves eUPF indicating a solution for 5G evolution to enable SFC. The user plane path can be set up. Generally, the first Comm SF/eUPF can be configured as the service classifier.

In one or more embodiments, the present disclosure may provide a ULCL enhancement for a service classifier at an eUPF. The eUPF can filter the SFC packets based on packet filter for the purpose of DL traffic classification (as a PSA) or UL multi-homing. In this case, after applying the required packet filter, the eUPF can not only steer the SFC traffic based on the SFC path but may also apply the related encapsulation/modification to the packet. The configuration of SFC service classifier is shown as a modification of an existing ULCL setup procedure. UE requests to set up SFC service following a message flow. Based on the SFC service context including UE's subscription, network slice, application type, etc., the SOCF/SMF decide to set up SFC service classifier at a eUPF. SMF may perform eUPF selection based on the requirements of the SFC service and capability of the eUPF. SMF establishes the SFC service classifier rule in the selected eUPF which includes: The packet filter information for the service classifier, the mapped traffic forwarding rule based on the service classification, and/or the modification to the SFC packets such as encapsulation or modification to the packet header. The SMF updates RAN such as a xNB the eUPF (SFC service classifier) information. Thus, the xNB may apply a traffic forwarding rule similar to a DRB to TEID mapping.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A shows an example service function chaining (SFC) traffic path 100 for SFC service classification, in accordance with one or more example embodiments of the present disclosure.

Referring to FIG. 1, a UE device 102 may communicate (e.g., send PDUs to) a xNB 104, which may have a service classifier 106 (e.g., indicating whether a PDU is SFC or non-SFC) for both Comm SF or eUPF transport (e.g., Comm SF 1/eUPF 1, Comm SF 2/eUPF 2, . . . , Comm SF N/eUPF N). There may be one or more Comm SFs/eUPFs to form an SFC traffic path. For each of the Comm SF or eUPFs, there may be one or more SFs (e.g., SFs 110 for Comm SF 1/eUPF 1, SFs 114 for Comm SF 2/eUPF 2, SFs 118 for Comm SF N/eUPF N), depending on the mechanisms to enable SFC, for example. The traffic path may include an Comm SF or anchor UPF (e.g., UPFs/Comm SF 120) to connect to a DN 122, or the traffic path can terminate at a SF.

In one or more embodiments, a SFC traffic path is defined as the combination of transport and ordered list of SFs in the path. The QoS differentiated at transport level and SF level are not included in the traffic path, which means the SFC flows using the same SFC traffic path may have different QoS at transport level and SF level. Functions in a SFC path include a traffic classifier and traffic forwarder towards the SFs. The SFC traffic paths can be categorized into two scenarios based on the service classifier at the xNB 104 and at one or more of the Comm SFs/eUPFs.

FIG. 1B shows an example SFC traffic path 150 for SFC service classification, in accordance with one or more example embodiments of the present disclosure.

Referring to FIG. 1B, the Comm SFs/eUPFs may have a service classifier (e.g., the Comm SF 1/eUPF 1 may have service classifier 152, the Comm SF 2/eUPF 2 may have service classifier 154, the Comm SF N/eUPF N may have service classifier 156). Specifically, the SFC path only involves an eUPF indicating a solution for 5G evolution to enable SFC. The user plane path can be set up following a procedure. Generally, the first Comm SF/eUPF can be configured as the service classifier.

Figure 2:
FIG. 2 shows an example 6th Generation (6G) system architecture for SFC service classification, in accordance with one or more example embodiments of the present disclosure.
Figure 2:
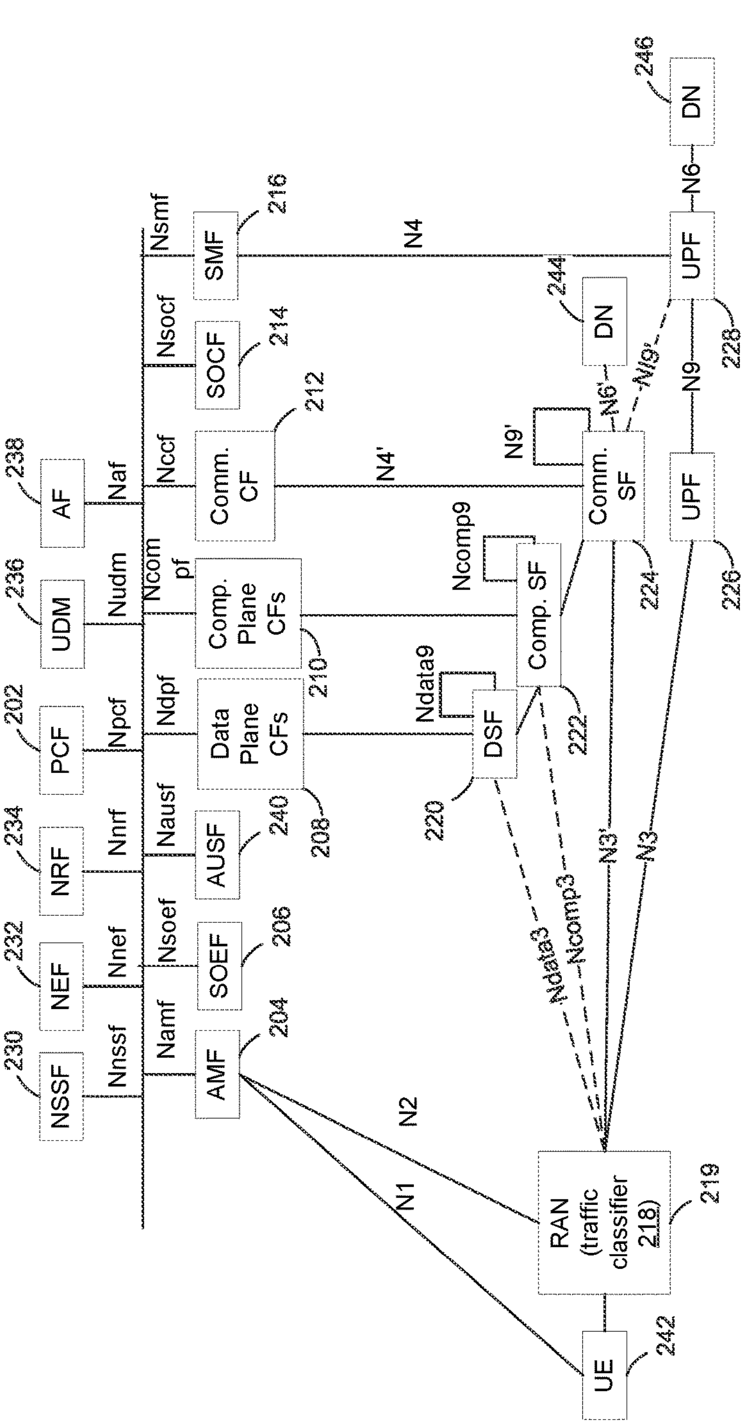

FIG. 2 shows an example 6th Generation (6G) system architecture 200 for SFC service classification, in accordance with one or more example embodiments of the present disclosure.

Figure 8:
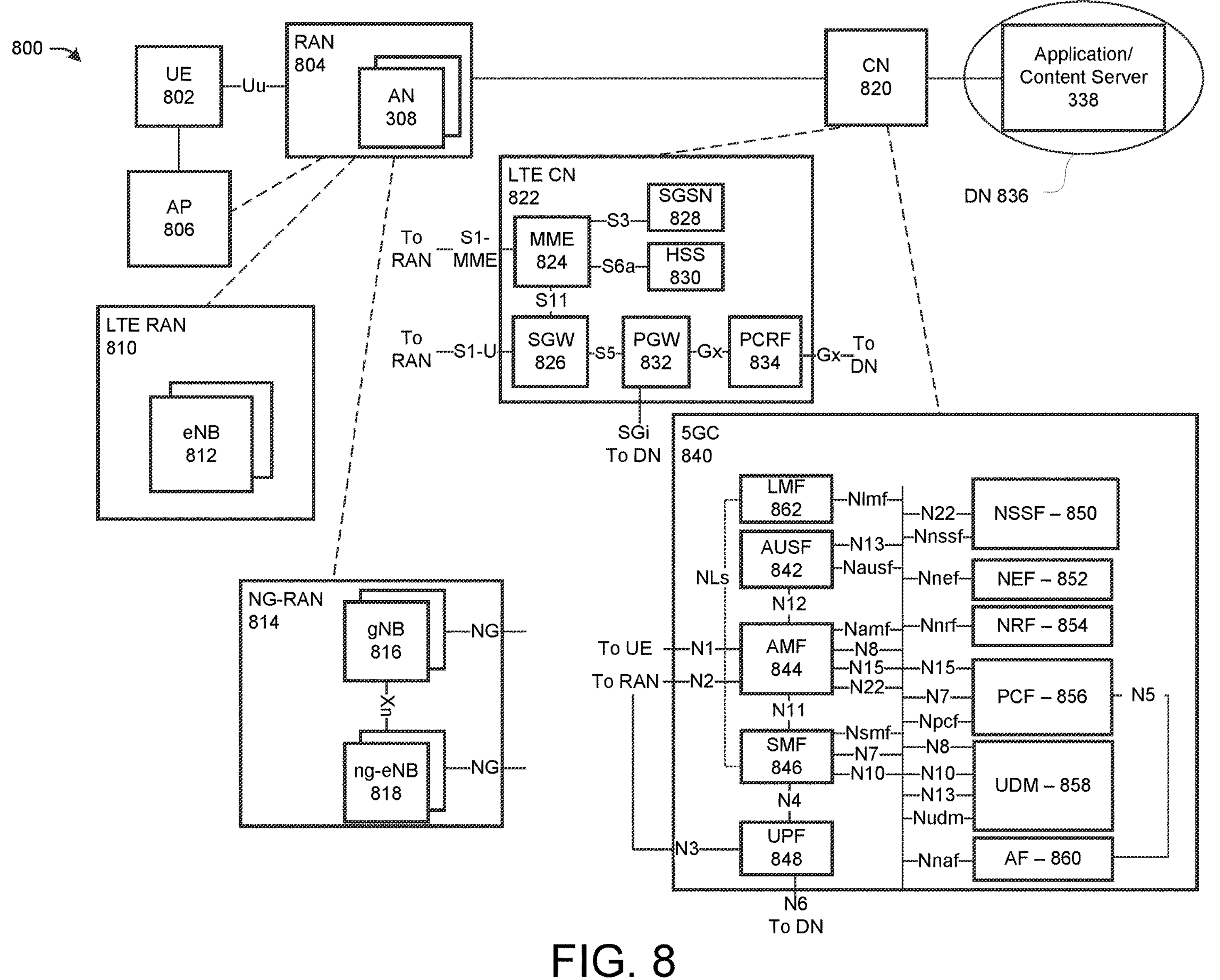
FIG. 8 illustrates a network, in accordance with one or more example embodiments of the present disclosure.

Referring to FIG. 2, the 6G system architecture 200 enhances (e.g., from the existing 5G system architecture as shown in FIG. 8) a PCF 202, an AMF 204, adds (e.g., to the existing 5G system architecture as shown in FIG. 8) a SOEF 206, data plane CFs 208, comp. plane CFs 210, a comm. CF 212, a SOCF 214, enhances a SMF 216 (e.g., from the existing 5G system architecture as shown in FIG. 8), adds a traffic classifier 218 to a RAN 219, adds a DSF 220, adds a comp. SF 222, adds a comm. SF 224, adds a UPF 226, and adds a UPF 228.

Still referring to FIG. 2, the 6G system architecture 200 includes, from the 5G architecture (e.g., shown in FIG. 8), a NSSF 230, an NEF 232, an NRF 234, a UDM 236, an AF 238, an AUSF 240, a UE 242, a DN 244, and a DN 246.

In one or more embodiments, the functionalities of comm. CF 212 include, but are not limited to, communication service management to SFC or non-SFC services to other NFs via Nccf, selection and control of comm. SF for setting up SFC or non-SFC communication services (e.g., select comm. SF 224 based on capabilities, location for mobility), configuration of one or multiple comm. SFs via N4' for the following: (1) The supported transport/networking protocols of different layers, (2) The matching rules for a traffic flow based on criteria such as protocol, meta-data, physical or virtual port ID, packet filter like the IP 5 tuple, ethernet address, vLAN tag, etc., (3) The routing information for a traffic flow based on the traffic matching rules, and (4) The action taken for a traffic flow based on the traffic matching rules. The functionalities of comm. CF 212 also may include life cycle management of comm. SFs, i.e., onboard, offboard or migrate, and charging data collection for communication services.

In one or more embodiments, the functionalities of comm. SF 224 include, but are not limited to, communication services such as packet routing and forwarding on user plane based on different protocols and traffic rules, attachment, modification, or removal of packet labels based on configuration from comm. CF 212, application of traffic rules such as traffic matching rules and taking required actions based on the configuration from comm. CF, anchor point to handle mobility of the UE 242 to complement the UPF 226, and traffic monitoring and reporting to comm. CF 212.

In one or more embodiments, the functionalities of SOCF 214 include, but are not limited to, providing service orchestration and chaining services, e.g., SFC establishment, modification and release to NFs via Nsocf or to a UE, generating comp./comm./data plane configurations and requests based on service orchestration requirements, and generating a charging record based on transactions about SFC.

In one or more embodiments, the functionalities of SOEF 206 include, but are not limited to, exposing the service orchestration and chaining capabilities to third party such as AFs, supporting service discovery of service orchestration and chaining to AFs, handling service orchestration and chaining requests based on the configured policies of the cellular network, generating service requirements to SOCF 214 to request for orchestration and chaining services from AFs, and exposure of interfaces to AFs to manage NFs as well as firmware and profiles used by NF software/hardware. For example, vendors can provide hardware platform/accelerator technologies to improve UPF 226 or other NFs' performance such as throughput and latency, also including SFC support directly in the accelerator. SOEF 206 can be an enhanced functionality to NEF 232 or a standalone function.

In one or more embodiments, the SFC service context may refer to the information to define SFC service and related requirements, generally including two aspects: the SFC information, and the transport/networking information. The SFC context information is exchanged during the setup of a SFC logic with the related control plane functions such as SOCF 214, SMF 216, comp./data/comm. CFs 208, 210, 212. Then the control plane functions can further configure the required user plane functions on the SFC path. SFC information includes but not limited to: Service ID: identify a SFC service; Application ID/Type, e.g., APN/DNN; UE ID/UE group ID; Network slice ID; Access type; PDU session ID and related information such as PSAs if the SFC service belongs to a PDU session; Traffic Type/classification rules; Security related information: keys, credentials; Service continuity mode; SFC requirements: Required network chains for SFs such as comp./data service information and its order; the related metadata to describe the computing capabilities and workloads and the data functions and storage as described in computing manifest, and required QOS such as the QoS characteristics on the traffic flow like GBR, non-GBR, priority, maximum data rate, latency, etc. and additional requirements on service function processing such as required computing resource, processing priority, delay, etc.; required capabilities such as protocols for data description protocol; and required location of the Comp/data service functions. The transport/networking information includes, but is not limited to, the typical SFC dynamic configuration information will include: network and interface information such as ethX, network CIDR, and network type: VLAN, etc. Transport/networking mapping/routing rule: Required overlay/underlay such as enhanced UPF 226 to support GTP tunneling, Segment Routing (SR) as a transport/networking protocol; required communication model such as load balancing, multipath, etc.; and required protocol and encapsulation options such as without service layer encapsulation, with service layer encapsulation, or with service layer and SR combination encapsulation.

In one or more embodiments, the Nsocf_SFC (e.g., create, update, release) are services provided to V/I-SOCF for roaming purposes similar to Nsmf_PDUSession (e.g., create, update, release) as described in clause 5.2.8.1 3GPP TS 23.502. The Nsocf_SFC (e.g., CreateSFCContext, UpdateSFCContext, ReleaseSFCContext) are services provided to establish/update/release the SFC context information to setup/modify/delete a SFC flow. The other services are subscription/notifications to expose SFC related information and event to a NF such as SOEF 206, AMF 204, SMF 216, etc. SOCF 214 can be an enhanced functionality to an existing NF for 5G such as the SMF 216 or a standalone function.

Figure 3:
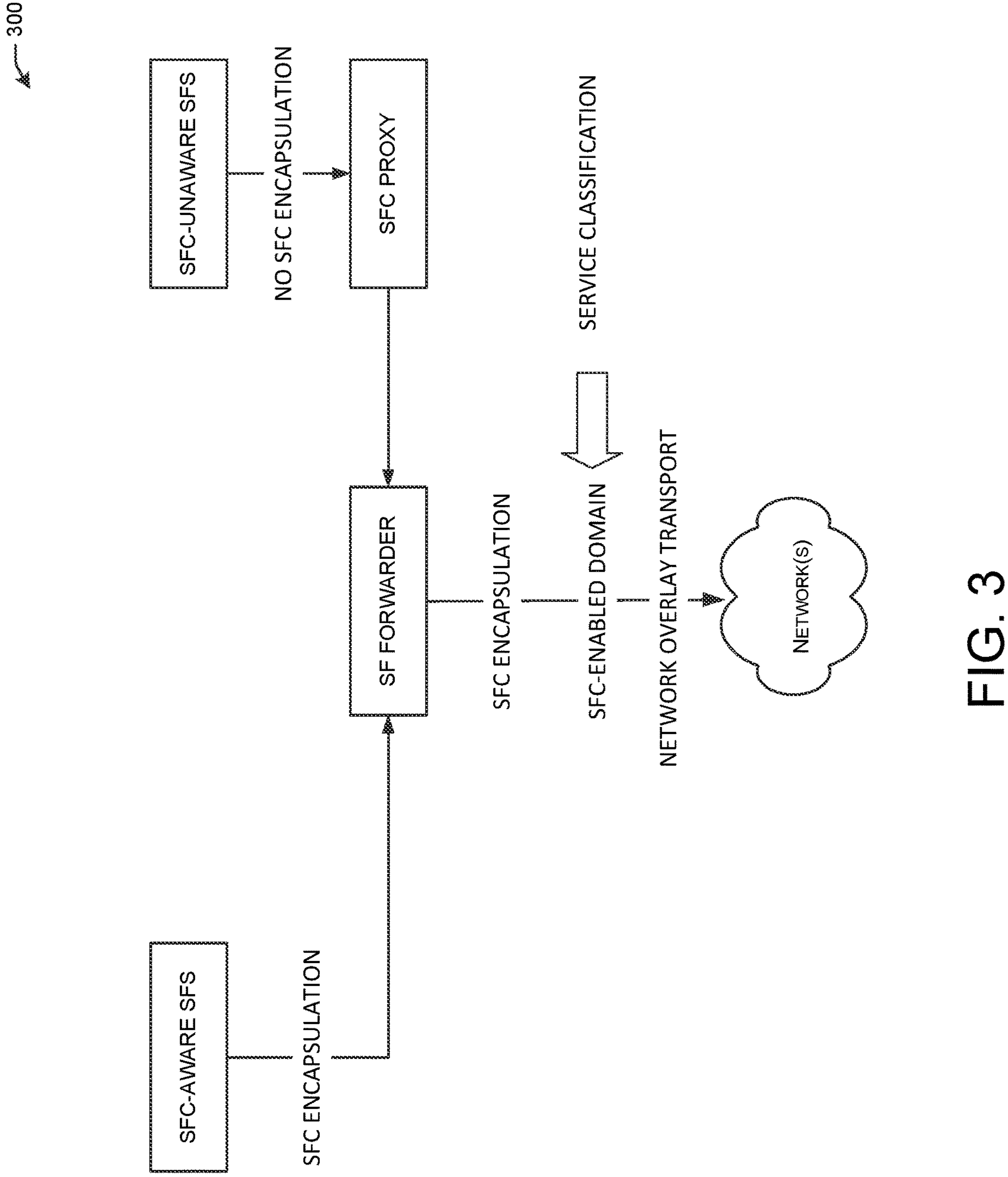
FIG. 3 shows an example SFC framework, in accordance with one or more example embodiments of the present disclosure.

FIG. 3 shows an example SFC framework 300, in accordance with one or more example embodiments of the present disclosure.

After traffic classification, an encapsulation or transport mapping rule can be applied to steer the SFC flow to a SFC path with traffic forwarders and the required SFs as shown in FIG. 3 as an example. The purpose of SFC and non-SFC classification is to differentiate different packets/flows based on rules from different layers such as IP 5-tuple, packet/flow identifiers, applications, QoS, or for the purpose of load balancing, etc.

In next generation cellular networks, the SFC service can consist of the Comp/data service functions (SFs) such as a data labeling and pre-processing function or an application instance as a computing workload. The current 5G network handles non-SFC flows based on a QoS framework to set up within PDU sessions (i.e., end to end tunnel) between UE and a PDU session anchor UPF with DRB mapping at the gNB.

The gNB performs a DRB to TEID mapping based on the SDAP entity configuration and PDU session information set up by the RRCReconfiguration Message and PDU session establishment/modification procedure. The UL SDAP data PDU with SDAP header is shown in FIG. 4.

Figure 4:
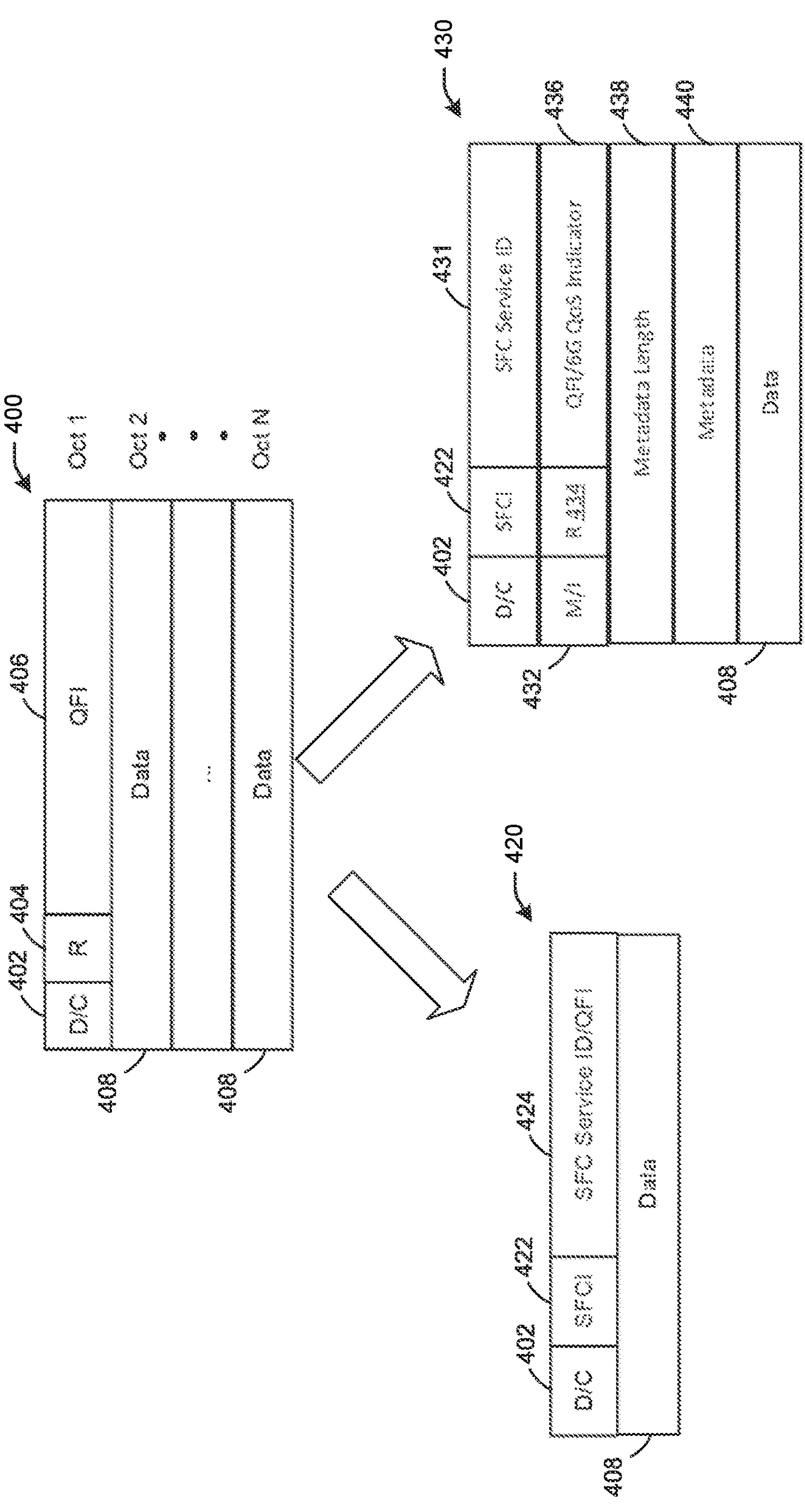
FIG. 4 shows example service data adaption protocol (SDAP) data units for SFC service classification, in accordance with one or more example embodiments of the present disclosure.

FIG. 4 shows example service data adaption protocol (SDAP) data units for SFC service classification, in accordance with one or more example embodiments of the present disclosure.

Referring to FIG. 4, a UL SDAP data PDU 400 with SDAP header is shown, and may include a one-bit D/C field 402 to indicate whether the SDAP is a control PDU or not, a one-bit R field 404 with a reserved bit, and a multi-bit QFI field 406 to indicate a QoS flow with a QFI. The UL SDAP data PDU 400 may include data 408 over one or more octets (e.g., octets 1-N).

Still referring to FIG. 4, a UL SDAP data PDU 420 may represent a modification to the UL SDAP data PDU 400 by including a SFC indicator (SFCI) 422 and a SFC service ID 424. The SFCI 422 may be a 1-bit indicator set as 1 to replace R field 404, which is reserved and always set to 0. When the SFCI 422 is set to 1, the following field is the SFC service ID 424 instead of the QFI field 406. The SFC service ID 424 may be the SFC identifier for a SFC profile and may be used with or without a PDU session. The length of the SFC service ID 424 can be different from a QFI/5QI.

Still referring to FIG. 4, a UL SDAP data PDU 430 may represent a modification to the UL SDAP data PDU 400 by including the SFCI 422, a SFC service ID 431 (e.g., similar to the SFC service ID 424), a M/I field 432 (e.g., 1-bit SFC metadata indicator. If the M/I field 432 is set to 1, there is metadata included in the SDAP header), a R field 434 (e.g., 1-bit reserved and generally set as 0), a QFI/6G QOS indicator 436 (e.g., the QoS identifier for the SFC traffic characteristics similar to current QFI/5QI. The QFI/6G QOS indicator 436 can be part of the SFC service profile), a metadata length field 438 (e.g., the bit or byte number of the SFC metadata), metadata 440, and the data 408.

In one or more embodiments, the metadata 440 may represent SFC information, including, but not limited to, the information for service classification at the xNB, the metadata to the SFs for the SFC traffic path, the update for SFC parameters/policy, application related information, and UE related information. The metadata 440 may be a container which is sent periodically between UE and xNB or triggered by events such as from application.

In one or more embodiments, while not shown, a DL SDAP header modification is similar to the UL and sent from xNB to UE.

Figure 5A:
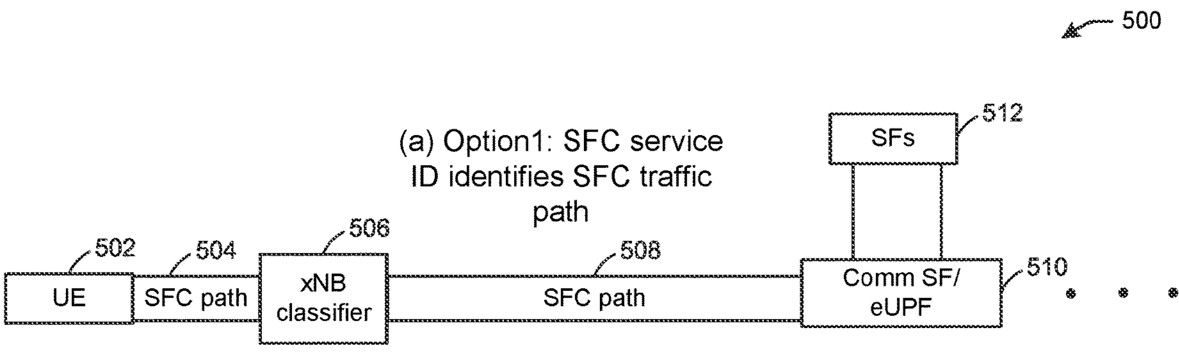
FIG. 5A shows an example SFC service classification in which a SFC service identifier identifies a SFC traffic path, in accordance with one or more example embodiments of the present disclosure.

FIG. 5A shows an example SFC service classification 500 in which a SFC service identifier identifies a SFC traffic path, in accordance with one or more example embodiments of the present disclosure.

In FIG. 5A, a SFC service identifier identifies the SFC traffic path with a default traffic path QoS. A UE 502 may use a SFC traffic path 504 to communicate with an xNB 506 having a classifier, and the xNB 506 may use a SFC traffic path 508 to communicate with a comm SF/eUPF 510 (and potentially other comm SF/eUPFs, such as shown in FIGS. 1A and 1B), which may communicate with respective SFs (e.g., SF 512).

In this option, the SFC service ID is similar to a PDU session ID for SFC and additional SF level QoS can be handled at application layer, e.g., through meta-data or app-level information. The PDU session ID for SFC can be reused as a SFC service ID as long as the SFC traffic path are the same. For this option, the SDAP header is not modified, but the SDAP entity configuration is updated to include a PDU-sessionType as SFC or non-SFC.

Figure 5B:
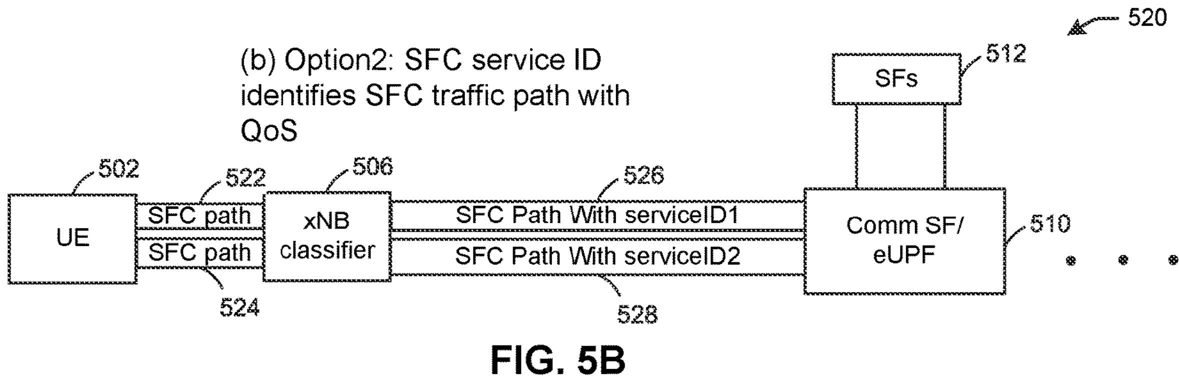
FIG. 5B shows an example SFC service classification in which a SFC service identifier identifies a SFC traffic path with a quality of service, in accordance with one or more example embodiments of the present disclosure.

FIG. 5B shows an example SFC service classification 520 in which a SFC service identifier identifies a SFC traffic path with a quality of service, in accordance with one or more example embodiments of the present disclosure.

In FIG. 5B, the SFC service ID may identify a SFC traffic path, and an additional QFI or 6G QOS identifier may be used for a different QoS profile. The UE 502 may use multiple SFC paths (e.g., SFC path 522, SFC path 524) to communicate with the xNB 506, which may use multiple SFC paths (e.g., SFC path 526 with serviceID1, SFC path 528 with serviceID2) to communicate with the comm SF/eUPF 510 and SFs 512. In this option, the UL SDAP data PDU 430 of FIG. 4 may be used, and SFC flows with different QFI/6G QOS ID can share the same service ID and SDAP entity.

Figure 5C:
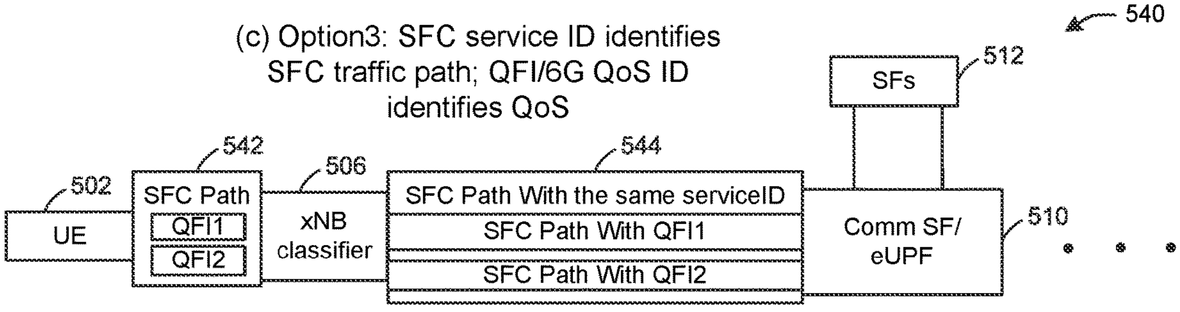
FIG. 5C shows an example SFC service classification in which a SFC service identifier identifies a SFC traffic path, and in which another identifier identifies a quality of service, in accordance with one or more example embodiments of the present disclosure.

FIG. 5C shows an example SFC service classification 540 in which a SFC service identifier identifies a SFC traffic path, and in which another identifier identifies a quality of service, in accordance with one or more example embodiments of the present disclosure.

In FIG. 5C, the SFC service ID can identify a path with SFC service ID, and an additional QFI or 6G QOS identifier may be used for a different QoS profile. The UL SDAP data PDU 430 of FIG. 4 may be used. For this option, SFC flows with different QFI/6G QOS ID can share the same service ID and SDAP entity. The UE 502 may use a SFC path 542 with multiple QFI options (e.g., QFI 1, QFI 2) to communicate with the xNB 506, which may use a SFC path 544 having a SFC path with QFI 1 and a SFC path with QFI 2 to communicate with the comm SF/eUPF 510 and SFs 512.

In one or more embodiments, the difference between the options in FIGS. 5A-5C and an alternative solution, in which no PDU session is used for SFC flows, is that SFC flows without a PDU session do not need a PSA. Therefore, mobility may be handled differently. The options in FIGS. 5A-5C may still apply, and the SFC service ID may be used to identify a SDAP entity.

Figure 6:
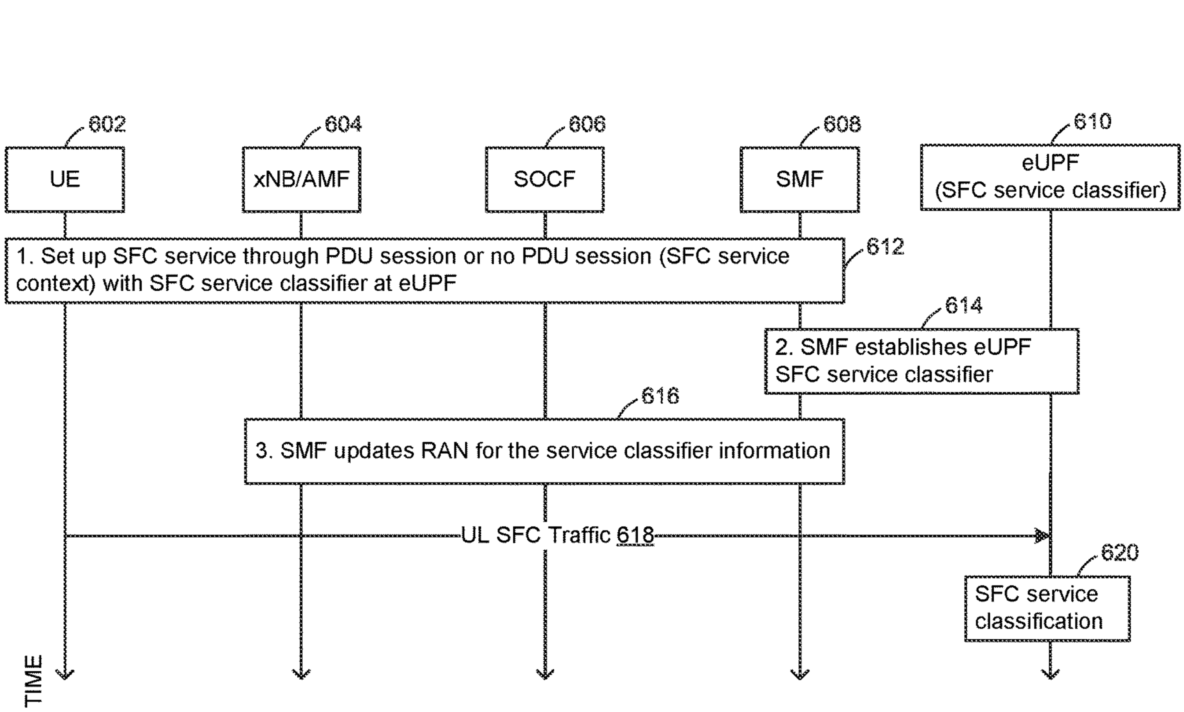
FIG. 6 shows a process for configuring a SFC service classifier, in accordance with one or more example embodiments of the present disclosure.

FIG. 6 shows a process 600 for configuring a SFC service classifier, in accordance with one or more example embodiments of the present disclosure.

Referring to FIG. 6, the process 600 may include a UE 602, a xNB/AMF 604, a SOCF 606, a SMF 608, and a eUPF 610 with a SFC service classifier.

At step 612, the UE 602 requests to set up SFC service following a message flow. Based on the SFC service context including UE's subscription, network slice, application type, etc., the SOCF 606 and/or the SMF 608 decide to set up SFC service classifier at the eUPF 610.

The SMF 608 may perform eUPF selection based on the requirements of the SFC service and capability of the eUPF 610.

At step 614, the SMF 608 establishes the SFC service classifier rule in the selected eUPF which includes: The packet filter information for the service classifier, the mapped traffic forwarding rule based on the service classification, and/or the modification to the SFC packets such as encapsulation or modification to the packet header.

At step 616, the SMF 608 updates RAN, such as the xNB, on the eUPF 610 (SFC service classifier) information. Thus, the xNB may apply a traffic forwarding rule similar to a DRB to TEID mapping to forward UL SFC traffic 618, and the eUPF 610 may perform the SFC service classification 620 using the SFC service classifier.

Figure 7:
FIG. 7 illustrates a flow diagram of illustrative process for SFC service classification, in accordance with one or more example embodiments of the present disclosure.
Figure 7:
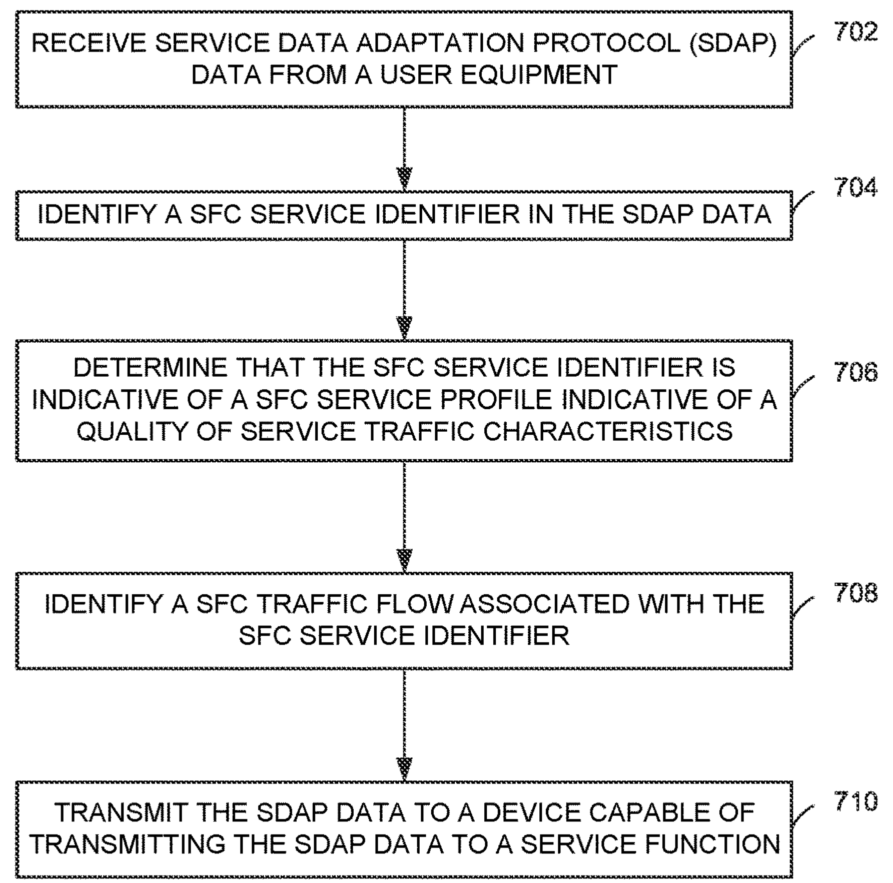

FIG. 7 illustrates a flow diagram of illustrative process 700 for SFC service classification, in accordance with one or more example embodiments of the present disclosure.

At block 702, a device (or system, e.g., a node B device such as the xNB 104 of FIGS. 1A and 1B) may receive SDAP data (e.g., using one of the formats shown in FIG. 4) from a UE (e.g., the UE 102 of FIGS. 1A and 1B).

At block 704, the device may identify a SFC service identifier (e.g., the SFC service ID 424 or the SFC service ID 431 of FIG. 4) in the SFC data. The SFC service identifier may differentiate the SFC data from non-SFC data (e.g., SFC classification).

At block 706, the device may determine that the SFC service identifier in the SDAP data is indicative of a SFC service profile. The SFC service profile may be indicative of QoS traffic characteristics used to control the transmission of the SDAP data.

At block 708, the device may identify a SFC traffic flow indicated by the SFC service identifier and with which to forward the SDAP data.

At block 710, the device may transmit the SDAP data to a device (e.g., a communication service function such as the Comm SFs/UPFs of FIGS. 1A and 1B, or a UPF such as the UPFs 120 of FIGS. 1A and 1B). The device may receive the SDAP data and may transmit the SDAP data to a service function (e.g., the SFs 114 and the SFs 118 of FIGS. 1A and 1B).

It is understood that the above descriptions are for purposes of illustration and are not meant to be limiting.

FIG. 8 illustrates a network 800, in accordance with one or more example embodiments of the present disclosure.

The 6G system architecture 200 of FIG. 2 may add to and enhance the network 800. In this manner, the components of the 6G system architecture 200 that also are shown in FIG. 8 may be capable of the functionalities described below with respect to FIG. 8, and to the additional enhanced functionalities described above with respect to FIG. 2.

The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems (e.g., 5G systems), or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an SI interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 1036 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 1038 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, AF 860, and LMF 862 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QOS; lawful intercept (for SM events and interface to L1 system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 821 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1058 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3rd party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

The LMF 862 may receive measurement information (e.g., measurement reports) from the NG-RAN 814 and/or the UE 802 via the AMF 844. The LMF 862 may use the measurement information to determine device locations for indoor and/or outdoor positioning.

Figure 9:
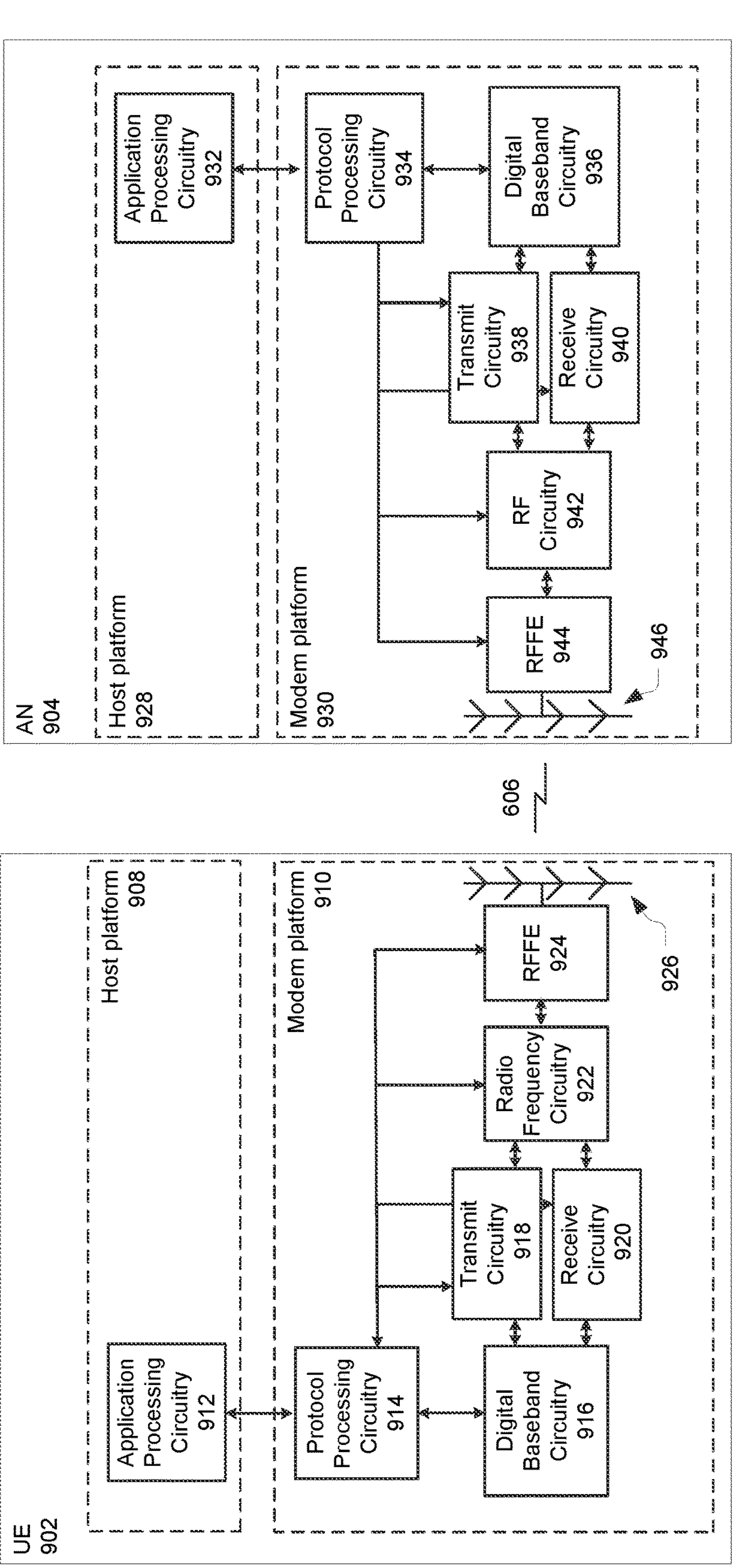
FIG. 9 schematically illustrates a wireless network, in accordance with one or more example embodiments of the present disclosure.

FIG. 9 schematically illustrates a wireless network 900, in accordance with one or more example embodiments of the present disclosure.

The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHZ frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Figure 10:
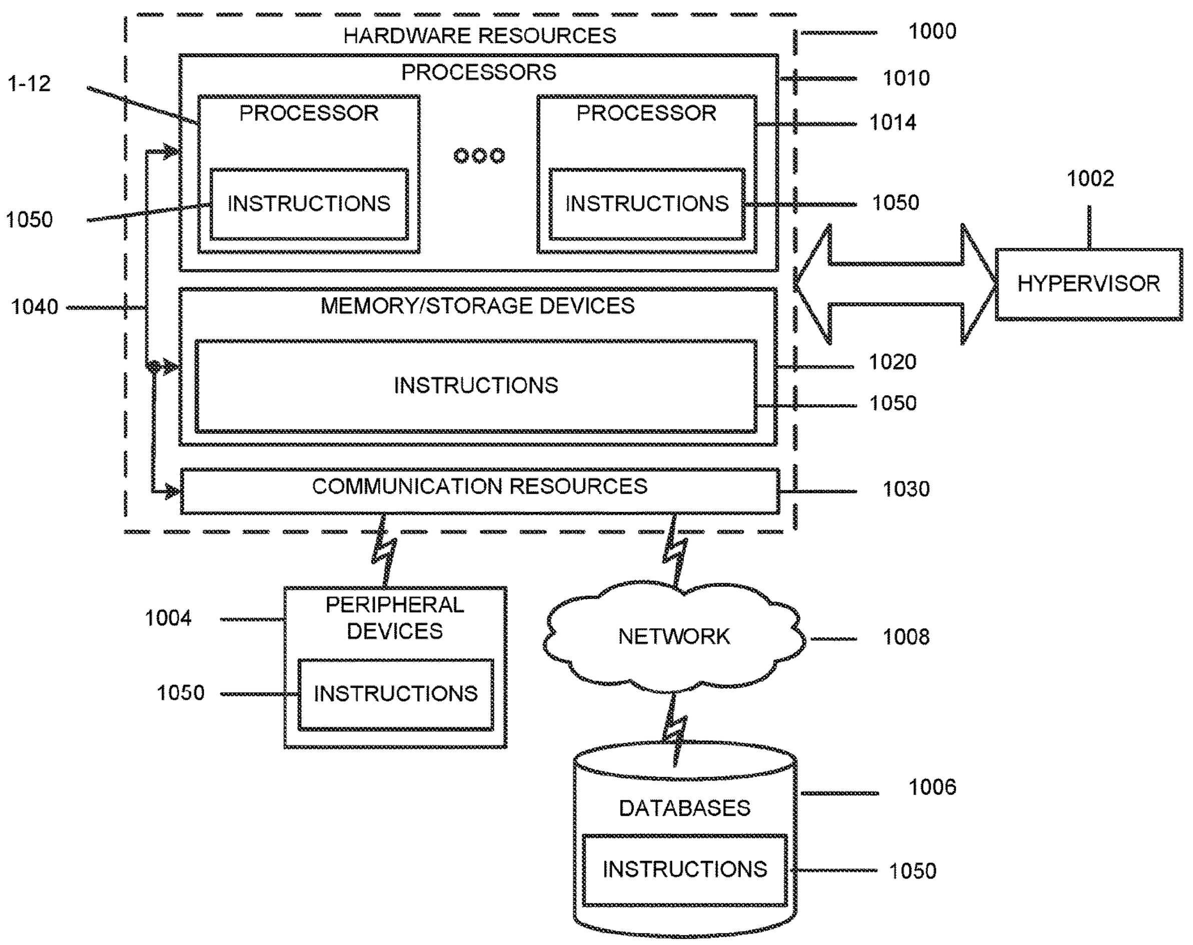
FIG. 10 is a block diagram illustrating components, in accordance with one or more example embodiments of the present disclosure.

FIG. 10 is a block diagram 1000 illustrating components, in accordance with one or more example embodiments of the present disclosure.

The components may be able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Various embodiments are described below.

Example 1 may be a system for performing service function chaining classification in wireless networks, the system comprising: a first cellular network device configured to: receive service data adaptation protocol (SDAP) data from a user equipment (UE) device, the SDAP data comprising a SDAP header; identify a service chaining function (SFC) service identifier of the SDAP header; determine that the SFC service identifier is indicative of a SFC service profile, the SFC service profile indicative of quality of service (QOS) traffic characteristics; identify a SFC traffic flow associated with the SFC service identifier; and transmit the SDAP data to a second cellular network device; and the second cellular network device, wherein the second cellular network device is configured to: receive the SDAP data from the first cellular network device; and transmit the SDAP data to a service function of the system.

Example 2 may include the system of example 1 and/or some other example herein, wherein the first cellular network device is a node B device, and wherein the second cellular network device is a communication service function.

Example 3 may include the system of example 1 and/or some other example herein, wherein the first cellular network device is a node B device, and wherein the second cellular network device is a user plane function.

Example 4 may include the system of any of examples 1-3 and/or some other example herein, wherein the SDAP header further comprises a SFC indicator field set to 1 to indicate that the SFC service identifier is included in the SDAP header.

Example 5 may include the system of any of examples 1-3 and/or some other example herein, wherein the SDAP header further comprises a SFC metadata indicator field to indicate that SFC metadata is included in the SDAP header.

Example 6 may include the system of example 5 and/or some other example herein, wherein the SFC metadata comprises: SFC service classification information; SFC traffic path metadata; SFC parameter and policy updates; application-related information; and UE-related information.

Example 7 may include the system of example 1 and/or some other example herein, wherein the SFC traffic flow shares a same protocol data unit (PDU) session with a non-SFC traffic flow, and wherein the SFC service identifier is further indicative of a modification of a SDAP configuration to facilitate SFC traffic flows and of a SFC traffic mapping rule associated with mapping a next hop transport identifier or an encapsulation.

Example 8 may include the system of example 1 and/or some other example herein, wherein a first PDU session of the SFC traffic flow is separate from a second PDU session of a non-SFC traffic flow.

Example 9 may include the system of example 1 and/or some other example herein, wherein the SFC traffic flow is unassociated with any PDU sessions.

Example 10 may include the system of example 1 and/or some other example herein, wherein the first cellular network device or the second cellular network device is configured to filter the SDAP data based on a packet filter.

Example 11 may include a computer-readable storage medium comprising instructions to cause processing circuitry of a communications network system, upon execution of the instructions by the processing circuitry, to: receive, at a first device of the communications network system, service data adaptation protocol (SDAP) data from a user equipment (UE) device, the SDAP data comprising a SDAP header; identify, at the first device, a service chaining function (SFC) service identifier of the SDAP header; determine, by the first device, that the SFC service identifier is indicative of a SFC service profile, the SFC service profile indicative of quality of service (QOS) traffic characteristics; identify, at the first device, a SFC traffic flow associated with the SFC service identifier; and transmit, by the first device, the SDAP data to a second device of the communications network system; receive, at the second device, the SDAP data from the device; and transmit, by the second device, the SDAP data to a service function of the communications network system.

Example 12 may include the computer-readable medium of example 11 and/or some other example herein, wherein the first device is a node B device, and wherein the second device is a communication service function.

Example 13 may include the computer-readable medium of example 11 and/or some other example herein, wherein the first device is a node B device, and wherein the second device is a user plane function.

Example 14 may include the computer-readable medium of any of examples 11-13 and/or some other example herein, wherein the SDAP header further comprises a SFC indicator field set to 1 to indicate that the SFC service identifier is included in the SDAP header.

Example 15 may include the computer-readable medium of any of examples 11-13 and/or some other example herein, wherein the SDAP header further comprises a SFC metadata indicator field to indicate that SFC metadata is included in the SDAP header.

Example 16 may include the computer-readable medium of example 15 and/or some other example herein, wherein the SFC metadata comprises: SFC service classification information; SFC traffic path metadata; SFC parameter and policy updates; application-related information; and UE-related information.

Example 17 may include the computer-readable medium of example 11 and/or some other example herein, wherein the SFC traffic flow shares a same protocol data unit (PDU) session with a non-SFC traffic flow, and wherein the SFC service identifier is further indicative of a modification of a SDAP configuration to facilitate SFC traffic flows and of a SFC traffic mapping rule associated with mapping a next hop transport identifier or an encapsulation.

Example 18 may include the computer-readable medium of example 11 and/or some other example herein, wherein a first PDU session of the SFC traffic flow is separate from a second PDU session of a non-SFC traffic flow.

Example 19 may include the computer-readable medium of example 11 and/or some other example herein, wherein the SFC traffic flow is unassociated with any PDU sessions.

Example 20 may include a method for performing service function chaining classification in wireless networks, the method comprising: identifying, by processing circuitry of a session management function (SMF) of a communications network system, a request, received from a user equipment (UE) device, to establish a service chaining function (SFC) service; selecting, by the processing circuitry of the SMF, based on the request, a user plane function (UPF) of the communications network system with which to establish a SFC service classifier for the SFC service; generating, by the processing circuitry of the SMF, a SFC service classifier rule for the selected UPF, the SFC classifier rule associated with forwarding traffic; and causing transmission, by the processing circuitry of the SMF, to a radio access network (RAN) device of the communications network system of an indication of the SFC service classifier rule and the UPF Example 21 may include the method of example 20 and/or some other example herein, wherein the SFC classifier rule comprises at least one of packet filter information for packets associated with the SFC service classifier, a traffic forwarding rule based on the SFC service classifier, or a modification of SFC packets based on the SFC service classifier.

Example 22 may include the method of example 21 and/or some other example herein, the modification comprising encapsulation or modification of a packet header.

Example 23 may include the method of example 20 and/or some other example herein, wherein further comprising identifying a SFC service context, wherein selecting the UPF is based on the SFC service context.

Example 24 may include an apparatus comprising means for: identifying, with a session management function (SMF) of a communications network system, a request, received from a user equipment (UE) device, to establish a service chaining function (SFC) service; selecting, by the SMF, based on the request, a user plane function (UPF) of the communications network system with which to establish a SFC service classifier for the SFC service; generating, by the SMF, a SFC service classifier rule for the selected UPF, the SFC classifier rule associated with forwarding traffic; and causing transmission, by the SMF, to a radio access network (RAN) device of the communications network system of an indication of the SFC service classifier rule and the UPF.

Example 25 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 26 may include an apparatus comprising logic, modules, and/or circuitry to perform one or more elements of a method described in or related to any of examples 1-24, or any other method or process described herein.

Example 27 may include a method, technique, or process as described in or related to any of examples 1-24, or portions or parts thereof.

Example 28 may include an apparatus comprising: one or more processors and one or more computer readable media comprising instructions that, when executed by the one or more processors, cause the one or more processors to perform the method, techniques, or process as described in or related to any of examples 1-24, or portions thereof.

Example 29 may include a method of communicating in a wireless network as shown and described herein.

Example 30 may include a system for providing wireless communication as shown and described herein.

Example 31 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

Unless used differently herein, terms, definitions, and abbreviations may be consistent with terms, definitions, and abbreviations defined in 3GPP TR 21.905 v16.0.0 (2019-06) and/or any other 3GPP standard. For the purposes of the present document, the following abbreviations (shown in Table 1) may apply to the examples and embodiments discussed herein.

TABLE 1

| Abbreviations: | |
|---|---|
| 3GPP | Third Generation Partnership Project |
| 4G | Fourth Generation |
| 5G | Fifth Generation |
| 5GC | 5G Core network |
| AC | Application Client |

TABLE 1-continued

| Abbreviations: | |
|---|---|
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |

TABLE 1-continued

| Abbreviations: | |
|---|---|
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |

TABLE 1-continued

| Abbreviations: | |
|---|---|
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |

TABLE 1-continued

| Abbreviations: | |
|---|---|
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |

TABLE 1-continued

| Abbreviations: | |
|---|---|
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit -type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |

TABLE 1-continued

| Abbreviations: | |
|---|---|
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |

TABLE 1-continued

| Abbreviations: | |
|---|---|
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |

TABLE 1-continued

| Abbreviations: | |
|---|---|
| SSID | Service Set Identifier |
| SS/PBCH Block | |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |

TABLE 1-continued

| Abbreviations: | |
|---|---|
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

What is claimed is:

1. A system for performing service function chaining classification in wireless networks, the system comprising:
- a first cellular network device configured to:
  - receive service data adaptation protocol (SDAP) data from a user equipment (UE) device, the SDAP data comprising a SDAP header;
  - identify a service chaining function (SFC) service identifier of the SDAP header;
  - determine that the SFC service identifier is indicative of a SFC service profile, the SFC service profile indicative of quality of service (QOS) traffic characteristics;
  - identify a SFC traffic flow associated with the SFC service identifier; and
  - transmit the SDAP data to a second cellular network device; and
- the second cellular network device, wherein the second cellular network device is configured to:
  - receive the SDAP data from the first cellular network device; and
  - transmit the SDAP data to a service function of the system.

2. The system of claim 1, wherein the first cellular network device is a node B device, and wherein the second cellular network device is a communication service function.

3. The system of claim 1, wherein the first cellular network device is a node B device, and wherein the second cellular network device is a user plane function.

4. The system of claim 3, wherein the SDAP header further comprises a SFC indicator field set to 1 to indicate that the SFC service identifier is included in the SDAP header.

5. The system of claim 3, wherein the SDAP header further comprises a SFC metadata indicator field to indicate that SFC metadata is included in the SDAP header.

6. The system of claim 5, wherein the SFC metadata comprises:
- SFC service classification information;
- SFC traffic path metadata;
- SFC parameter and policy updates;
- application-related information; and
- UE-related information.

7. The system of claim 1, wherein the SFC traffic flow shares a same protocol data unit (PDU) session with a non-SFC traffic flow, and wherein the SFC service identifier is further indicative of a modification of a SDAP configuration to facilitate SFC traffic flows and of a SFC traffic mapping rule associated with mapping a next hop transport identifier or an encapsulation.

8. The system of claim 1, wherein a first PDU session of the SFC traffic flow is separate from a second PDU session of a non-SFC traffic flow.

9. The system of claim 1, wherein the SFC traffic flow is unassociated with any PDU sessions.

10. The system of claim 1, wherein the first cellular network device or the second cellular network device is configured to filter the SDAP data based on a packet filter.

11. A non-transitory computer-readable storage medium comprising instructions to cause processing circuitry of a communications network system, upon execution of the instructions by the processing circuitry, to:

receive, at a first device of the communications network system, service data adaptation protocol (SDAP) data from a user equipment (UE) device, the SDAP data comprising a SDAP header;

identify, at the first device, a service chaining function (SFC) service identifier of the SDAP header;

determine, by the first device, that the SFC service identifier is indicative of a SFC service profile, the SFC service profile indicative of quality of service (QOS) traffic characteristics;

identify, at the first device, a SFC traffic flow associated with the SFC service identifier; and transmit, by the first device, the SDAP data to a second device of the communications network system;

receive, at the second device, the SDAP data from the first device; and transmit, by the second device, the SDAP data to a service function of the communications network system.

12. The non-transitory computer-readable storage medium of claim 11, wherein the first device is a node B device, and wherein the second device is a communication service function.

13. The non-transitory computer-readable storage medium of claim 11, wherein the first device is a node B device, and wherein the second device is a user plane function.

14. The non-transitory computer-readable storage medium of claim 13, wherein the SDAP header further comprises a SFC indicator field set to 1 to indicate that the SFC service identifier is included in the SDAP header.

15. The non-transitory computer-readable storage medium of claim 13, wherein the SDAP header further comprises a SFC metadata indicator field to indicate that SFC metadata is included in the SDAP header.

16. The non-transitory computer-readable storage medium of claim 15, wherein the SFC metadata comprises:

SFC service classification information;

SFC traffic path metadata;

SFC parameter and policy updates;

application-related information; and

UE-related information.

17. The non-transitory computer-readable storage medium of claim 11, wherein the SFC traffic flow shares a same protocol data unit (PDU) session with a non-SFC traffic flow, and wherein the SFC service identifier is further indicative of a modification of a SDAP configuration to facilitate SFC traffic flows and of a SFC traffic mapping rule associated with mapping a next hop transport identifier or an encapsulation.

18. The non-transitory computer-readable storage medium of claim 11, wherein a first PDU session of the SFC traffic flow is separate from a second PDU session of a non-SFC traffic flow.

19. The non-transitory computer-readable storage medium of claim 11, wherein the SFC traffic flow is unassociated with any PDU sessions.

* * * * *